US012783166B2

(12) United States Patent
Baruch et al.

(10) Patent No.: US 12,783,166 B2
(45) Date of Patent: Nov. 3, 2026

(54) CLOUD STORAGE FOR EXCP-BASED MAINFRAME APPLICATIONS

(71) Applicant: BMC Software, Inc., Houston, TX (US)

(72) Inventors: Offer Baruch, Ganei Tikva (IL); James Patrick McCormick, Sugar Land, TX (US); Mauricio Kanter, Petach Tiqwa (IL); Prasanth Gopalakrishnan Nair, Chennai (IN); Shy Ifrah, Ashdod (IL); Sumit Kumar Soni, Pune (IN)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 18/962,492

(22) Filed: Nov. 27, 2024

(65) Prior Publication Data

US 2026/0147506 A1 May 28, 2026

(51) Int. Cl.
*G06F 12/00* (2006.01)
*G06F 3/06* (2006.01)

(52) U.S. Cl.
CPC .......... *G06F 3/0656* (2013.01); *G06F 3/0604* (2013.01); *G06F 3/0647* (2013.01); *G06F 3/0682* (2013.01)

(58) Field of Classification Search
CPC .... G06F 3/0656; G06F 3/0604; G06F 3/0647; G06F 3/0682
USPC .......................................................... 711/154
See application file for complete search history.

(56) References Cited

U.S. PATENT DOCUMENTS

| | | | | |
|---|---|---|---|---|
| 3,664,066 | A | 5/1972 | Clark | |
| 6,115,781 | A | 9/2000 | Howard | |
| 12,056,387 | B2 * | 8/2024 | Rabinov | G06F 3/0655 |
| 2006/0294127 | A1 | 12/2006 | Nettles | |
| 2014/0010517 | A1 | 1/2014 | Sheffler et al. | |
| 2014/0359168 | A1 * | 12/2014 | Carlson | G06F 3/0673 710/5 |

(Continued)

FOREIGN PATENT DOCUMENTS

AU 2004211213 A1 * 8/2004 ........... G06F 3/0689

OTHER PUBLICATIONS

IBM, z/OS Version 2 Release 4 DFSMS Using Magnetic Tapes, 2020, [retrieved from internet Jul. 13, 2022][<URL:https://www-40.ibm.com/servers/resourcelink/svc00100.nsf/pages/zOSV2R4sc236858/$file/idam300_v2r4.pdf>] (Year: 2020).

(Continued)

*Primary Examiner* — Mardochee Chery
(74) *Attorney, Agent, or Firm* — Brake Hughes Bellermann LLP

(57) ABSTRACT

Described techniques enable replacement of tape storage, e.g., for intermediate term processing and long term storage, using simulated tapes that may be stored using cloud memory or other suitable storage techniques. In described techniques, an open request for a dataset of an application may be determined. The dataset may be determined to be written to a simulated tape, and a buffer may be allocated in response to the open request. Channel command words of a channel program governing writing of the dataset may be intercepted. Data of the dataset may be written to the buffer based on the channel command words, and the data of the dataset may be copied from the buffer to the simulated tape.

20 Claims, 7 Drawing Sheets

(56) References Cited

U.S. PATENT DOCUMENTS

| | | | | |
|---|---|---|---|---|
| 2017/0300240 | A1 | 10/2017 | Gorlinsky | |
| 2019/0073155 | A1* | 3/2019 | Craig .................... | G06F 3/0604 |
| 2019/0317670 | A1* | 10/2019 | Weiss .................... | G06F 3/0608 |
| 2020/0004561 | A1 | 1/2020 | Kottler et al. | |
| 2020/0133885 | A1 | 4/2020 | Tshouva et al. | |
| 2020/0151064 | A1 | 5/2020 | Narula et al. | |
| 2020/0272353 | A1 | 8/2020 | Ainscow et al. | |
| 2020/0351347 | A1 | 11/2020 | Chang et al. | |
| 2021/0232331 | A1 | 7/2021 | Kannan et al. | |
| 2021/0232458 | A1 | 7/2021 | Lecrone et al. | |
| 2022/0137885 | A1* | 5/2022 | Zakharkin ............. | G06F 3/0686 711/162 |
| 2023/0393778 | A1* | 12/2023 | Rabinov ............... | G06F 3/0655 |

OTHER PUBLICATIONS

Ogden, IBM zPDT Guide and Reference System z Personal Development Tool, IBM, 2015 [retrieved from internet Jul. 14, 2022][<URL:http://itconline.com/wp-content/uploads/2016/04/redbooks.pdf>] (Year: 2015).

"Mainframestechhelp", Access Method; https://web.archive.org/web/20210726054407/https://www.mainframestechhelp.com/tutorials/vsam/file-access-methods.htm, 6 pages.

* cited by examiner

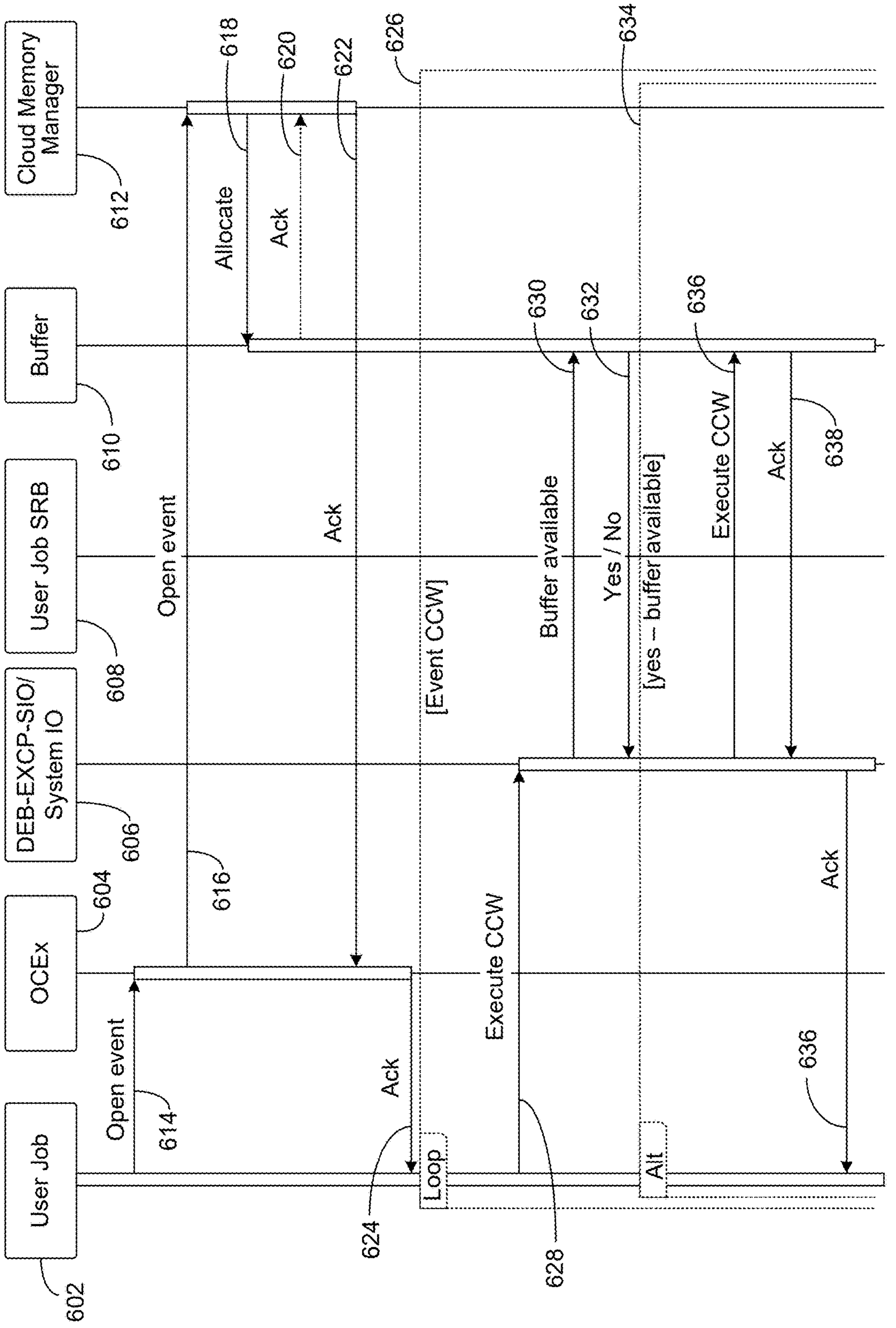
FIG. 6 Cont..next page

CLOUD STORAGE FOR EXCP-BASED MAINFRAME APPLICATIONS

TECHNICAL FIELD

This description relates to storage and use of mainframe application data.

BACKGROUND

Mainframe tapes have been a cornerstone in data storage and backup for decades, especially within enterprise environments. Tape storage is inexpensive and generally robust for long-term storage, and mainframe applications have historically been written with the expectation of interacting with (e.g., reading from, writing to) tapes.

Such tapes, however, are also associated with various difficulties and challenges. For example, physical space is required to store tapes, and tape storage is inherently sequential, making random data access slow compared to disk storage. This can be a bottleneck for applications needing quick data retrieval. While tapes are generally robust for long-term storage, they can degrade over time, especially if not stored in optimal conditions. Moreover, tapes require careful handling, and physical damage or improper winding can render data irretrievable. Also, the need for periodic cleaning and maintenance of tape drives adds to the operational overhead. As tape technology evolves, older tapes might not be readable on newer equipment, which necessitates data migration to new formats or maintaining old hardware, both of which can be costly. Additionally, there are other burdens such as mounting and/or unmounting of tapes, managing tape names, managing partially filled tapes, identifying empty tapes for use, storing tapes over time, and maintaining the hardware of physical tape drives that are required to read tapes. Data on tapes is also susceptible to permanent data loss in the event of, e.g., tape malfunctions.

Some attempts have been made to leverage more modern storage techniques to mitigate difficulties associated with using tape storage. For example, virtual tape drives have been created that use disk-based memory to emulate tape storage. However, such approaches are expensive in both purchase price and operational costs, and do not scale to a level necessary to reduce or eliminate reliance on tape storage. Moreover, existing applications designed to interact with tapes are often sizable, complex, and required to provide services to large numbers of users (e.g., customers). It is therefore risky and resource-consuming to modify such legacy applications to interact with new storage media. As a result, mainframe users are typically required to continue to use tape storage to some extent.

SUMMARY

According to some general aspects, a computer program product may be tangibly embodied on a non-transitory computer-readable storage medium and may include instructions. When executed by at least one computing device, the instructions may be configured to cause the at least one computing device to determine an open request for a dataset of an application, determine that the dataset should be written to a simulated tape, and allocate a buffer in response to the open request. When executed, the instructions may be further configured to cause the at least one computing device to intercept channel command words of a channel program governing writing of the dataset, write data of the dataset to the buffer based on the channel command words, and copy the data of the dataset from the buffer to the simulated tape.

According to other general aspects, a computer-implemented method may perform the instructions of the computer program product. According to other general aspects, a system, such as a mainframe system or a distributed server system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

DETAILED DESCRIPTION

Figure 1:
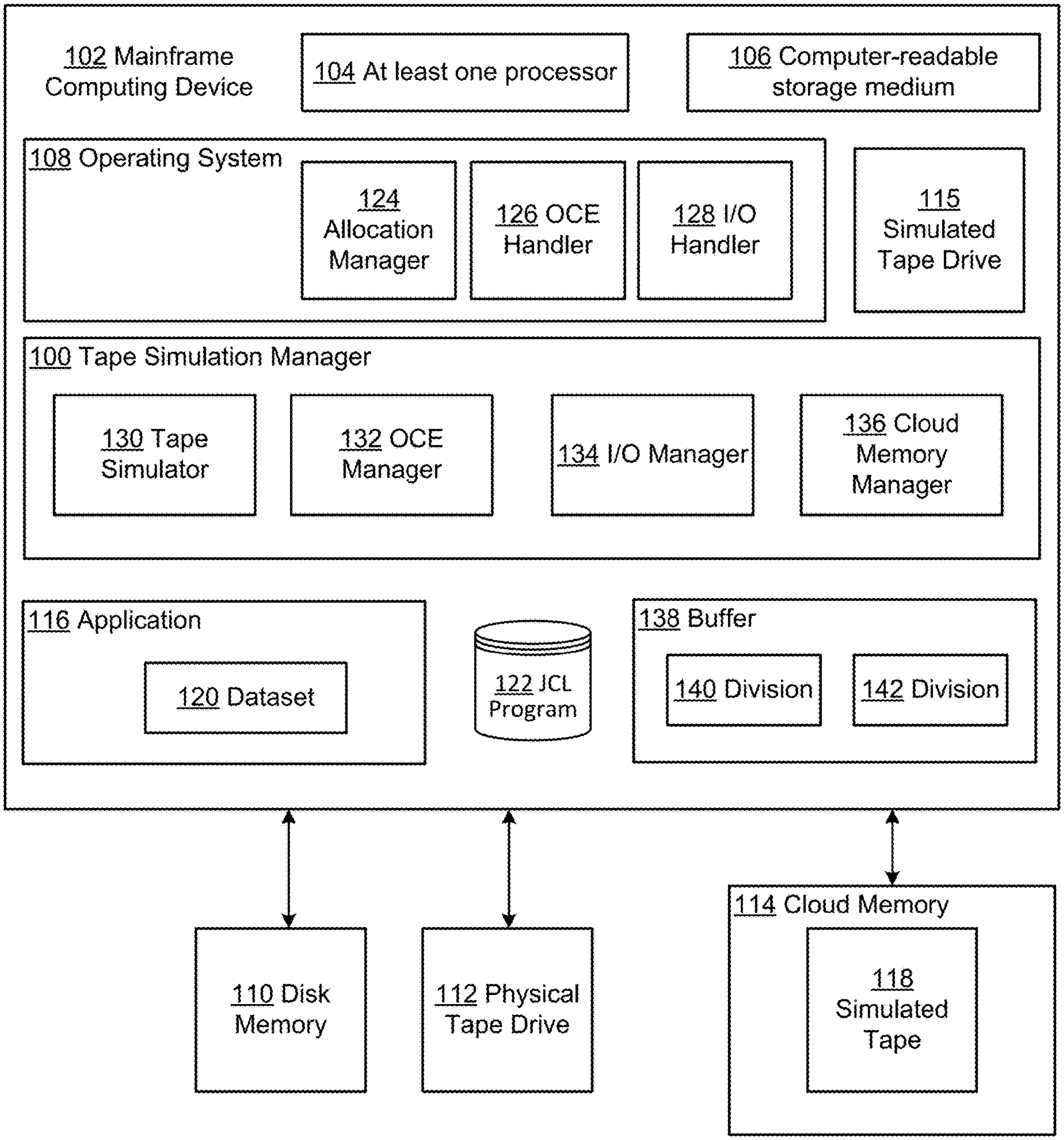
FIG. 1 is a block diagram of a system for simulated tapes for mainframe application jobs and storage.

Described systems and techniques enable, for example, complete replacement of tapes with cloud memory in mainframe systems, without requiring changes to existing applications or other mainframe infrastructure. Described systems and techniques are interoperable with all or virtually all existing mainframe applications, regardless of which existing access technique(s) each such application uses to interact with conventional tape storage.

Moreover, described systems and techniques do not require users or administrators to take special actions or exert additional efforts to take advantage of cloud memory resources instead of tape resources. To the contrary, described systems and techniques reduce or eliminate many of the inconveniences and difficulties associated with using traditional (e.g., physical) tape storage.

As referenced above, conventional techniques use disk memory for low-latency, low-volume tasks that are designed to be completed quickly, such as executing a query against a database, while using tape memory for high-latency, high-volume tasks that take more time to complete, such as exporting the entire database for long-term storage. As also referenced above, there are numerous difficulties and challenges associated with using physical tape storage, including a requirement for serial writing and/or reading of data, physical handling of tapes, and many logistical difficulties that arise either from the nature of the tapes themselves or from historical requirements associated with using physical tapes.

Some existing systems allow for partial replacement of tape storage, but such systems are either impractical and/or unusable for large subsets of existing applications. For example, some existing solutions implement the types of virtual tape systems referenced above, in which disk storage is used to emulate tape storage. As also described above, such systems are not feasible (e.g., too expensive, or too resource-constrained) for use with the extremely large volumes of data that need to be handled by many existing applications.

Some existing systems are capable of reading data from disk to cloud memory. Again, however, the use of disks provides a chokepoint that causes such systems to be impractical to be used in large-scale data processing operations.

Some existing systems do provide for reading and/or writing data directly between an application and cloud memory, potentially obviating the use of tape storage for the application. Such techniques, however, rely on the application using a limited set of access methods, so that applications using other access method(s) do not benefit and are effectively required to continue to use tape storage. As a result, users of such applications are not able to entirely replace tape storage with cloud memory.

Described techniques, in contrast, enable complete replacement of tape storage with cloud memory across all or virtually all mainframe applications. As a result, users can eliminate the inconveniences and difficulties associated with using tape drives, including, e.g., mounting and/or unmounting the tapes, managing tape names, managing partially filled tapes, identifying empty tapes for use, storing tapes over time, and maintaining the hardware of physical tape drives.

Moreover, described techniques enable new use case scenarios that are not practical or feasible using existing disk storage and tape storage. For example, as referenced, conventional systems use disk storage for fast and/or frequent access to small quantities of data and use tape storage for slower and/or less frequent access to large quantities of data. Some use case scenarios, however, use intermediate quantities of data and access times. For example, some applications may sort a quantity of data into sorted data or may perform various types of batch processing of data, which may be too large to store effectively using disk storage. Some users may therefore temporarily store such data using tape storage. While cost-effective, such approaches suffer from the various difficulties associated with using tape storage. Moreover, it is difficult or impossible to backup tape data, so that the data is susceptible to permanent data loss in the event of, e.g., tape malfunctions.

Using described techniques, however, such intermediate quantities of data may simply be written to and/or read from cloud memory. As data stored in cloud memory is effectively and efficiently backed up, the danger of data loss is reduced or eliminated, as is the expense of using disk storage.

Additionally, even though the cloud memory being used may be remote from the relevant mainframe system (e.g., may be connected over a wide area network), described techniques enable faster writing and/or reading of data than is generally achievable using conventional physical tape storage. Such relative speeds are achieved because conventional physical tape storage requires serial writing and/or reading of data to tape, whereas described techniques provide parallel writing and/or reading of data to cloud memory.

Described techniques provide universal replacement of tape storage by, e.g., allocating simulated tape parameters of a simulated tape that are specific to an application. Then, for writing or reading of a dataset, described techniques may intercept, augment, and/or replace one or more aspects of an open operation initiated by or for the application. In the context of the open operation, a buffer may be assigned by a cloud memory handler for fast access by the application, and for parallel writing to/reading from cloud memory. Then, channel command words of a channel program governing the writing and/or reading operations may be intercepted and directed to the buffer, and the cloud memory handler may provide an interface between the buffer and the cloud memory.

Thus, described techniques enable mainframe application to interact with simulated tapes and simulated tape drives, without requiring any changes to the application(s) or to the mainframe operating system. In addition, write and/or read speeds may be improved over those available when using physical tapes or conventional virtual tapes, even when the simulated tapes are stored using remote cloud memory, because described techniques enable parallel writing and/or reading of datasets, and do not require the serial writing and/or reading of data required by conventional physical tapes.

Moreover, conventional physical tapes are limited in various ways in the manner(s) in which they can be used to store data. For example, physical tapes require a six-character volume name for each tape, and a set of volume names is limited to a maximum number of names that can be formulated using the available six-character limit.

Further, each physical tape is limited to a fixed, maximum quantity of data that may be stored. If the available quantity of data is not enough for a given dataset, then the dataset must be split over multiple tapes. If the available quantity of data is too much for a given dataset, then the tape used will not be filled, and a portion of the tape will remain empty and unused. It is possible to stack multiple small datasets on a single tape; however, taking this approach leads to other difficulties, e.g., when the multiple datasets have different expiration dates.

When using conventional physical tapes, then, it may be challenging to identify an available, empty (also referred to as scratch) tapes. It is possible to consolidate datasets across multiple tapes to empty one or more tapes for use, but doing so requires time and effort.

Conventional virtual tapes, e.g., implemented using disk memory, simply emulate physical tapes entirely, and therefore suffer from almost all of the above challenges, and related challenges. For example, conventional virtual tapes may be faster than conventional physical tapes merely by virtue of using low-latency disk memory, but still require serial writing and/or reading, which is inherently limiting. Conventional virtual tapes may obviate the need for physical mounting and/or unmounting of physical tapes, but still have the same limitations on e.g., individual tape size, available tape (volume) names, and identifying empty or scratch tapes, among others. Such limitations, in addition to the limitations inherent to disk memories (e.g., cost, size), make complete replacement of tape usage impractical for conventional virtual tapes.

In contrast, described techniques use simulated tapes, and can generate tape names that are specific to a given application, for simulated tapes that have larger available volumes than physical tapes. In other words, for example, two different applications may write data to two simulated tapes, where both tapes have the same name and use the same tape location(s) (e.g., same tape file sequence or location on the tape) for the data of each of the two applications. Thus, there is no need to identify an empty or scratch tape, because a new simulated tape may easily be generated when needed.

Moreover, larger quantities of data may be written to a single simulated tape, as compared to a single physical tape, and writing a smaller quantity of data to a simulated tape does not result in wasted storage space. In other words, the simulated tapes may have variable, adjustable tape sizes. Consequently, there is no need to reorganize or consolidate data across simulated tapes and/or stack data to conserve tape names, as there is when using physical tapes and/or virtual tapes.

Additionally, data stored in cloud memory using a simulated tape may easily be backed up to avoid potential data loss. Therefore, users may utilize simulated tapes in cloud memory to execute various processing tasks, without danger of data loss. For example, such processing tasks may include tasks that use more memory than is practically or feasibly available in the context of disk storage.

FIG. 1 is a block diagram of a system for simulated tapes for mainframe application jobs and storage. In FIG. 1, a tape simulation manager 100 is configured to provide the type of tape simulations referenced above, and described in more detail below, including all related features and advantages.

In more detail, in FIG. 1, the tape simulation manager 100 is illustrated as being provided in the context of a mainframe computing device 102, which may be referred to herein as a mainframe computer or mainframe, and which refers to any computer, or combination of computers in communication with one another, used to implement one or more various types of mainframe applications. In general, in mainframe systems, centralized processing is provided for, and linked to, many different workstations or terminals, e.g., in a corporate environment. For example, such mainframe systems may provide core functionalities in healthcare, insurance, banking and finance, energy and oil and gas, manufacturing, or industrial settings, may store and process vast amounts of data for millions of customers, and may have been in use for multiple decades.

In a mainframe environment, many different applications may leverage a central mainframe operating system (OS) 108 to perform various tasks, or jobs. For example, multiple applications, represented by an application 116 in FIG. 1, may require jobs to be performed by the OS 108, so that it becomes necessary to schedule a coordinated execution of the various jobs by the mainframe OS 108.

The mainframe OS 108 may include, or be supplemented by, various types of system services or subsystem services (also referred to as subsystems). For example, various types of subsystem services may be used to provide core functionalities likely to be useful to many types of applications. Such core functionalities may include, for example, opening or closing files, providing various types of calculations, or storing, accessing, and/or deleting data with respect to specific memory addresses.

Programming languages have been developed to enable applications to leverage such subsystems and other OS resources. For example, the Job Control Language (JCL) is an example language that may be used, e.g., to formulate, submit, and execute application jobs of a mainframe OS and associated subsystems.

As referenced above, many types of mainframe resources have been developed and used over the course of decades. Such mainframe resources may include, for example, the OS itself, OS subsystems, applications, hardware resources such as processors and memories, as well as job control programs used to enable desired interactions therebetween. Such mainframe resources may be extremely valuable to businesses or other entities using them.

Moreover, making changes to such mainframe resources may be undesirable or infeasible. For example, making changes to such mainframe resources may entail undesirable levels of risk, such as when many millions of customers or other users rely on the mainframe resources being modified. Moreover, even if a mainframe resource may be modified in a reliable manner, the corresponding modifications may require undesirable levels of cost, system downtime, and other inconveniences.

The mainframe 102 may be deployed by a business owner or organization, e.g., to support business functions. The mainframe 102 may support many different workstations or peripheral devices, or otherwise provide access and business functions to employees, administrators, customers, or other users.

The mainframe 102 is illustrated as including at least one processor 104 and non-transitory computer-readable storage medium 106. As the mainframe 102 supports business-critical functions for many (e.g., millions) of users, the at least one processor 104 may be understood to represent many different processors (e.g., some of which may be included as part of the mainframe 102 and some of which may be included outside of the mainframe 102 but within a mainframe computing environment of the mainframe 102) providing significant quantities of processing power. Similarly, the non-transitory computer-readable storage medium 106 represents large quantities of various types of memory (e.g., registers, main memory, buffers, or bulk/secondary memory) that may be used to store instructions executable by the at least one processor 104, as well as to store data (e.g., business data, including customer data).

In addition to providing large quantities of processing and memory resources, the mainframe 102 should be understood to provide many other features and advantages, some of which are described herein by way of example. To assist in providing these features and advantages, the operating system (OS) 108 may be configured to, and optimized for, characteristics and functions of the mainframe 102. The OS 108 may, for example, provide task scheduling, application execution, and peripheral control. Put another way, the OS 108 enables use of the at least one processor 104 and the computer-readable storage medium 106 across many different use cases of the mainframe 102.

The OS 108 may represent or include a suite or collection of system tools and services designed to support operations of the mainframe computing device 102. In many cases, such tools and services may evolve over time, and new tools and services may be added as they are developed. For example, the OS 108 may represent the z/OS® operating system, and may include, or utilize, a multiple virtual storage (MVS) system. In other examples, the OS 108 may use a z/OS Unix® system.

Further in FIG. 1, the mainframe computing device 102 is illustrated as being in communication with, or including, various types of memory that are illustrated in FIG. 1 separately from the non-transitory computer-readable storage medium 106. For example, as referenced above, the mainframe computing device 102 includes a disk memory 110, which provides low-latency access to the operating system 108 and the application 116. FIG. 1 also illustrates a physical tape drive 112, which may be used, if desired, for the type of low-latency, long-term data storage described above with respect to physical tapes.

Although the physical tape drive 112 is illustrated in FIG. 1 for completeness, and to illustrate that a user of the mainframe computing device 102 may elect to use physical tapes in some circumstances, a cloud memory 114 may be used to entirely replace, and eliminate a need for, the use of physical tapes. For example, the cloud memory 114 may be used to provide a simulated tape drive 115, in conjunction with simulated tapes, represented in FIG. 1 as simulated tape 118. The cloud memory 114 may represent any suitable memory that may be in communication with the mainframe computing device 102, e.g., over a network. For example, the cloud memory 114 may represent a public or private set of memory and related computing resources connected with the mainframe computing device 102 over the Internet, or may represent on-premise storage.

For the sake of example, FIG. 1 illustrates and describes examples in which a dataset 120 of the application 116 is written to the simulated tape 118 stored using the cloud memory 114. It will be appreciated, however, that inverse or otherwise related operations may be used to read a dataset from the simulated tape 118 for use by the application 116.

The application 116 represents virtually any application that may be executed using the mainframe computing device 102. For example, the application 116 may be configured to process various types of transactions, such as financial transactions. More generally, the application 116 may be configured to provide virtually any service or function that may be usable in the many contexts in which the mainframe computing device 102 may be deployed, such as in the healthcare, insurance, banking and finance, energy and oil and gas, manufacturing, or industrial settings referenced above. Provided functions may be as simple as, e.g., copying a data set, or as complex as may be supported by processing abilities of the at least one processor 104. The application 116 may be written using any known mainframe-compatible programming languages, such as, e.g., COBOL, PL/1, Assembler, or Java.

In providing intended functions, the application 116 may be said to perform or execute multiple, discrete tasks, or jobs. One or more of these tasks may include inputting and/or outputting data. For example, the application 116 may be configured to output one or more different types of reports. More generally, the application 116 may be configured to output virtually any type of dataset compatible with the physical tape drive 112 as the dataset 120.

To enable such outputs of the application 116, and to facilitate execution of the application 116 in general, a JCL program 122 may be used. As referenced above, JCL provides a scripting language that provides tasks or jobs of the application 116 to the OS 108, e.g., using a job manager subsystem (not shown in FIG. 1).

As also referenced above, both the application 116 and the JCL program 122 may represent large, complex, and/or stable programs that may have been in use by the mainframe computing device 102 for years or even decades. For example, the application 116 may be compiled and extremely stable, so that making changes to, and re-compiling and re-deploying, the application 116, may represent a large risk of time, resources, and consequences. Somewhat similarly, making changes to the JCL program 122 may also be difficult, time-consuming, and risky.

Therefore, in FIG. 1, the tape simulation manager 100 is configured to interact with the operating system 108 to simulate, from the perspective of both the operating system 108 and the application 116, simulated tape drive parameters for the simulated tape drive 115 and simulated tape parameters for the simulated tape 118, including interacting with the cloud memory 114. For example, the tape simulation manager 100 utilize one or more exits or intercepts with respect to operations of the operating system 108 and/or interactions between the application 116 and the operating system 108.

In general, an exit refers to points in the operating system 108 or the application 116 at which control may be passed to user-written routines, or at which users may insert their own code into an existing execution path. Exits provide predefined points at which a user may hook into existing software to modify functionality at runtime.

An intercept refers to capturing or altering data or control flow at points not necessarily designed for extensibility by the software itself, and may involve deeper system-level interventions. Thus, traditionally, both exits and intercepts generally aim to modify or extend system operations, but do so through somewhat different methodologies, with exits being more about customization and intercepts often about observation or enforcement.

In FIG. 1, as referenced, the tape simulation manager 100 implements various types of exits and/or intercepts with respect to defined operations of the operating system 108. Therefore, example relevant modules of the operating system 108 are illustrated in FIG. 1 for the sake of explanation and context.

For example, the operating system 108 is illustrated as including an allocation manager 124. The allocation manager 124 generally represents any allocation function of the operating system 108, where allocation refers to the process of assigning resources or storage to the application 116, individual job of the application 116, or individual dataset of the application 116, for use during runtime of the application 116 or individual job thereof. For example, in conventional contexts, the allocation manager 124 may be responsible for allocating requested memory type(s) to the application 116, such as the disk memory 110 or the physical tape drive 112.

An Open Close End of volume Exit (OCE) handler 126 is configured to handle various types of exits related to, e.g., opening a dataset, closing a dataset, or reaching the end of a tape volume. For example, service calls from the application 116, and other applications, generally refer to requests for a service from the operating system 108 (or other system software component). For example, service calls may exist for various types of input/output (I/O) operations (e.g., writing/reading data using the disk memory 110 or the physical tape drive 112), memory management operations (e.g., allocation or deallocation of memory), or file system services (e.g., open, close, read, or write datasets).

Pre-defined service calls are enumerated in mainframe contexts for ease of common use. For example, SVC 19 is a service call for an open operation, e.g., for making a dataset available for processing by an application or job step, including determining access parameters and data definitions. In another example, SVC 20 is designated for a close operation, to be used following the processing requested by the open operation, which may involve, e.g., releasing any locked data, clearing temporary memory that was used during the processing, and otherwise freeing system resources.

When the application 116 is loaded or otherwise initiated, the allocation manager 124, consistent with the description above, determines resources that will or may be needed by the application 116 as the application 116 executes. Such resources may include the disk memory 110 and, potentially, tapes mounted to the physical tape drive 112.

In described implementations, however, the tape simulation manager 100 may be configured to determine that at least some of the data of the application 116 (e.g., the dataset 120) should be written to a simulated tape, e.g., the simulated tape 118. For example, the allocation manager 124 may be configured to recognize the dataset 120 by file name, file type, user identifier, or any other designated characteristic. Thus, by configuring the allocation manager 124, a user or administrator of the mainframe computing device 102 may configure operations of the application 116 such that desired or designated datasets may be written to appropriate ones of the disk memory 110, the physical tape drive 112, or the simulated tape drive 115.

In some implementations, the allocation manager 124 may recognize designations of datasets to be written to the simulated tape 118 based on changes to either the application 116 and/or the JCL program 122. As referenced above, such changes are often non-preferred by users/administrators of the mainframe computing device 102, but can be made, if desired.

The allocation manager 124 may thus provide the simulated tape drive 115 for the simulated tape 118, using a tape simulator 130 of the tape simulation manager 100. For example, during a conventional allocation, as described, the allocation manager 124 may, e.g., determine that the physical tape drive 112 is available, and may determine that an empty/scratch tape provided by a user has been selected and mounted to the physical tape drive 112, and may determine any other necessary metadata regarding the mounted scratch tape, including, e.g., relevant headers/trailers read from the tape and processing mode(s).

Therefore, in the example of FIG. 1, the tape simulator 130 is configured to simulate all of these aspects and parameters of allocating tape resources. For example, the tape simulator 130 may generate a volume name of a simulated scratch tape, as well as simulated headers, trailers, and processing mode(s). In so doing, the tape simulator 130 is not required to perform the standard operations of, e.g., searching for an available scratch tape. Rather, the tape simulator 130 may simply generate a volume name of the simulated tape 118, e.g., randomly.

For example, the tape simulator 130 may generate volume names for simulated tapes, including the simulated tape 118, on an as-needed basis, and may avoid duplicate tape names for the application 116. Meanwhile, a second application (not shown in FIG. 1) may also utilize simulated tapes, and the tape simulator 130 may generate such simulated tapes for the second application, as well. In particular, as noted above, the tape simulator 130 may generate duplicative tape names for the application 116 and the second application, e.g., since the simulated tapes can be designated as application-specific, thereby avoiding the possibility of running out of available tape names (as may occur when using physical tapes across a plurality of applications).

The tape simulator 130 may also cause the allocation manager 124 to indicate to the application 116 that a tape drive is connected, and that a tape has been mounted. In other words, although the indicated tape drive and tape are simulated and not physical, the application 116 and the operating system 108 may proceed as if the simulated tape drive and tape(s) are real and physical, so that, for example, internal changes to the application 116 and/or the JCL program 122 are not required (but may be made if desired, as referenced above).

Then, to commence writing the individual dataset 120 to the simulated tape 118, the application 116 may initiate an open operation, e.g., by sending SVC 19 to the operating system 108. In some implementations, the OCE handler 126 may utilize the Open Close End of Volume Exit (OCE x) to determine the open operation event, and an OCE manager 132 of the tape simulation manager 100 may be configured to notify a cloud memory manager 136 to prepare for writing to the cloud memory 114.

For example, the cloud memory manager 136 may allocate a buffer 138 to be used in the transfer of the dataset 120 to the cloud memory 114, as described in more detail, below. Then, an I/O handler 128 of the operating system 108 may interact with an I/O manager 134 to install an I/O control block related to I/O events, such as the Data Extent Block StartIO (DEB SIO), which may then be used to intercept and manage write commands of the application 116 in writing the dataset 120.

In other implementations, rather than the OCE handler 126 utilizing the OCE exit in conjunction with the OCE manager 132 to install the DEB SIO prior to any write commands being received, the I/O handler 128 may detect an initial I/O operation (e.g., a startIO (SIO)) operation that occurs following completion of the open operation. For example, the I/O handler 128 may detect a first or initial write command for the dataset 120 (e.g., for writing to (or reading from) the buffer 138). Then, in response to the detecting of the first or initial write command, the I/O handler 128 may install the DEB SIO, which may then process the second and subsequent write commands (e.g., for writing to the buffer 138).

In some such configurations, the cloud memory manager 136 may be notified to allocate the buffer 138 in the context of an OCE exit, as described above, whereupon the open operation may complete and the first IO command (e.g., first StartIO) may be intercepted for installation of the DEB SIO, as just referenced. In other implementations, the I/O manager 134 may be configured to notify the cloud memory manager 136 to allocate the buffer 138 in response to, or in conjunction with, the first IO command (e.g., first StartIO), and installation of the DEB SIO may then be executed by the I/O manager 134.

In still other implementations, the I/O handler 128 and the I/O manager 134 may simply utilize SIO commands directly, without installing or using the DEB SIO. However, such implementations may be less efficient than using the DEB SIO, because of the associated overhead and additional operating system layers required.

More specifically, a DEB is a control block containing information about the physical allocation of data sets on storage devices. A DEB may include details and characteristics necessary for accessing the data set. The DEB thus maps out where on a storage device the data for a particular dataset is located.

As already described above, an intercept refers to a point in the system where the normal flow of operations can be altered or monitored. An SIO intercept thus involves capturing or modifying the I/O request before it reaches the relevant hardware (e.g., physical tape drive). Thus, the DEB SIO intercept, implemented by the I/O handler 134, enables redirecting of write-related operations to a desired location, e.g., the simulated tape 118 in the cloud memory 114.

More particularly, the write-related operations may be implemented as part of, or leveraging, a channel program of the application 116. In general, a channel program is a series of commands, also referred to as channel command words (CCWs), that control data transfer with I/O devices.

Figure 3:
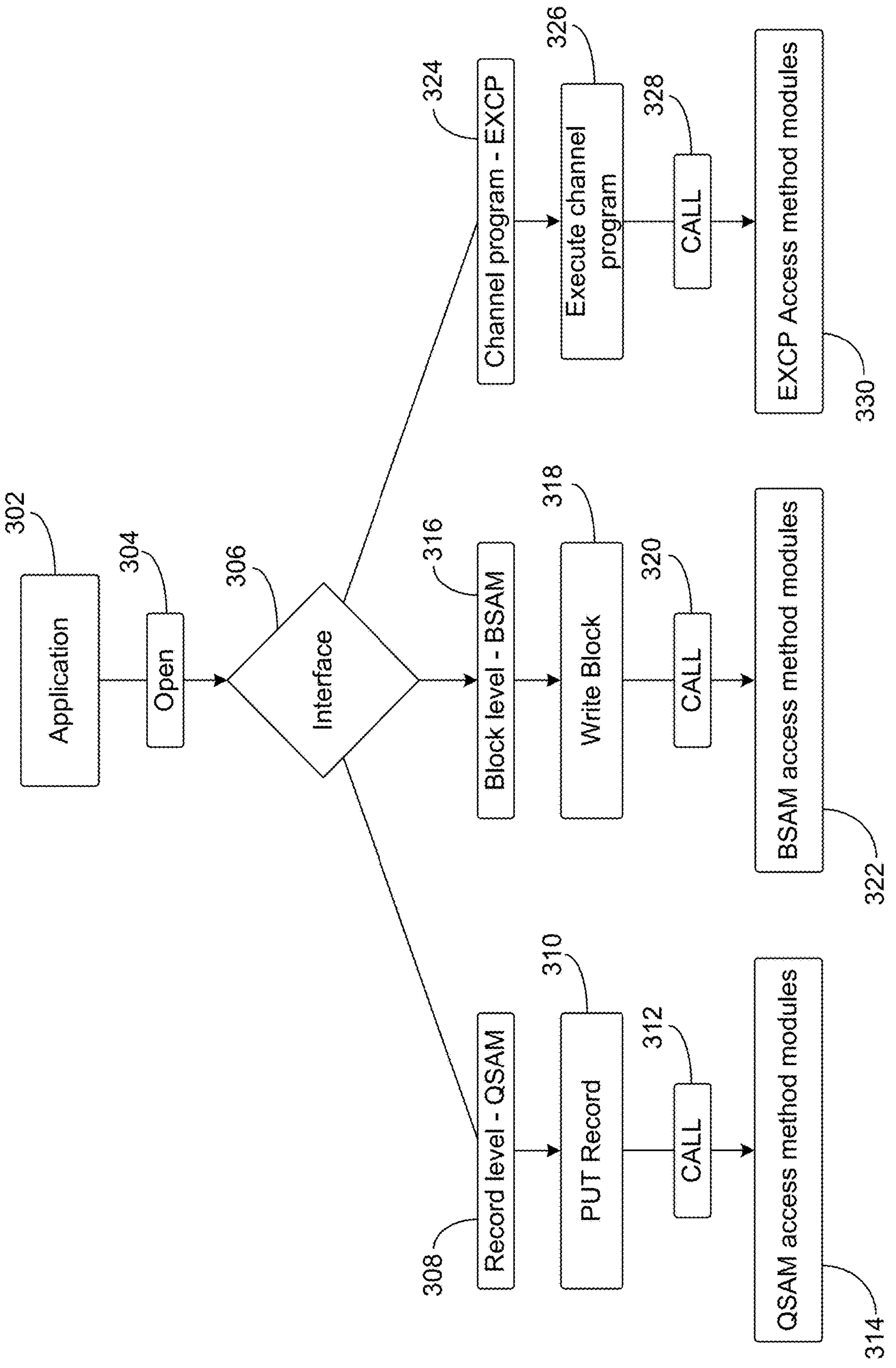
FIG. 3 is a more detailed flowchart illustrating example operations of the system of FIG. 1.
Figure 4:
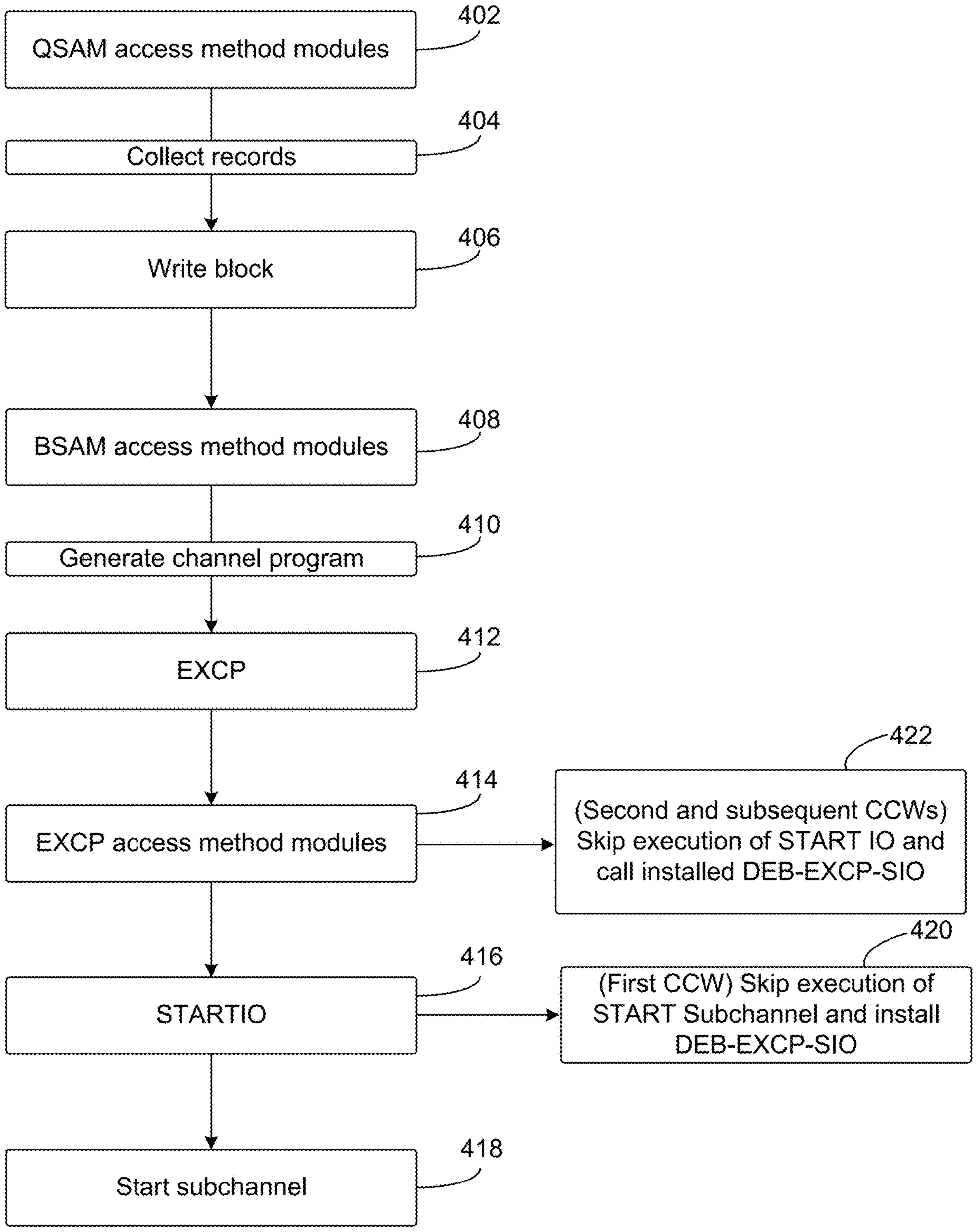
FIG. 4 is a block diagram illustrating example access methods that can be used with the examples of FIGS. 1-3.

As described in more detail with respect to FIGS. 3 and 4, a channel program is one way that the application 116 may write to (or read from), or otherwise access, one or more of the memories available to the application 116 (e.g., the disk memory 110, a physical tape mounted to the physical tape drive 112, or the simulated tape 118 of the cloud memory 114. Other access methods include, e.g., Queued Sequential Access Methods (QSAM), or Basic Sequential Access Methods (BSAM).

A channel program may be used as part of an Execute Channel Program (EXCP) access methodology for writing/reading data (as well as other operations, e.g., tape positioning). As just referenced, different features and aspects of QSAM, BSAM, and EXCP are described in more detail, below, with respect to FIGS. 3 and 4. For purposes of FIG. 1, it may simply be appreciated that the I/O handler 134 may be configured to receive CCWs of the channel program associated with the dataset 120, and to execute the associated channel command(s) (e.g., a write command to write data of the dataset 120) with respect to the previously allocated buffer 138.

For example, as shown, the buffer 138 may include multiple divisions, e.g., two or more divisions, but shown as two division 140 and division 142 in FIG. 1 for simplicity. The I/O handler 134 may serially or sequentially write data of the dataset 120 to the division 140, and the cloud memory manager 136 may then write the data in parallel, e.g., in chunks, to the simulated tape 118. Therefore, as already noted, the tape simulation manager 100 may write data to the simulated tape 118 in cloud memory 114 faster than the same data could be written to a physical tape mounted to the physical tape drive 112, even if the cloud memory 114 is remote from the mainframe computing device 102, because writing to the simulated tape 118 is performed in parallel, rather than sequentially.

Using the multiple divisions 140, 142 enables efficient sizing and management of the buffer 138. For example, when the division 140 is full, the application 116 may continue writing to the division 142, while contents of the division 140 are pushed to the simulated tape 118. Meanwhile, write speeds for writing to the simulated tape 118 will typically be faster than write speeds of the application 116 to the buffer 138. Therefore, when the division 140 is full, writing to the division 142 begins, and writing of the contents of the division 140 to the simulated tape 118 will generally complete prior to filling of the division 142.

Once writing of the contents of the division 140 to the simulated tape 118 completes, the division 140 may be emptied, so that writing to the division 140 may be started again once the division 142 is full. In this way, writing to the simulated tape 118 may continue with few or no pauses, even when the buffer 138 is orders of magnitude smaller in size than the dataset 120 or the simulated tape 118.

Thus, the application 116 may provide synchronous writing to the cloud memory 114 during most operations or circumstances. In the event that the buffer 138 becomes completely full (e.g., if there is a delay in sending data to the cloud memory 114), received CCWs may be queued until buffer space is available. In such cases, the application 116 may experience asynchronous writing, e.g., the application 116 may be required to be paused until writing can continue. Due to the serial nature of physical tapes, the application will generally always experience asynchronous transfer when using physical tapes (e.g., writing a subsequent block cannot continue until a preceding block is completed), but asynchronous transfer is provided in described implementations only when needed, e.g., due to external circumstances.

Once the relevant channel program has been completed and the entire dataset 120 has been written to the buffer 138, the application may execute a close operation, e.g., using the relevant close SVC 20 that is handled by the OCE handler 126. Thus, as with the open SVC 19, the OCE handler 126 may be configured to detect the SVC 20 close, delay the close operation until all data is flushed from the buffer 138 to the simulated tape 118, and execute close operations/events (including giving the application 116 confirmation that the dataset was closed after flushing of the buffer data was completed).

For example, the cloud memory manager 136 may be caused to ensure that the buffer 138 is empty of all data of the dataset 120. Then, the cloud memory manager 136 may proceed to deallocate the buffer 138, and any other conventional close events (e.g., associated with SVC 20) may be performed to complete the closing operation.

The simulated tape 118 may be organized and stored within the cloud memory 114 using any of a number of suitable techniques, in conjunction with data of many other simulated tapes of the same or different application(s). For example, an index may be used to organize the various simulated tapes and associated data.

During subsequent read operations, the same or similar components and operations may be used as described above with respect to the tape simulation manager 100, the operating system 108, and the application 116. For example, the allocation manager 124 may allocate the simulated tape drive 115, and the OCE handler 126 may determine an open operation for opening and accessing the dataset 120 when stored on the simulated tape 118.

The OCE handler 126 may coordinate with the cloud memory manager 136 to allocate the buffer 138. In some implementations, the OCE handler 126 may coordinate with the I/O manager 134 to install the DEB SIO prior to completion of the open operation and prior to any read operations commencing. For example, the DEB SIO in these examples may handle the first channel command word of a channel program, along with all following channel command words.

In other implementations, the open operation may complete and the I/O handler 128 and the I/O manager 134 may detect an initial read operation associated with a system I/O, e.g., the start I/O, and then install the DEB SIO to handle second and subsequent read operations. For example, the Start IO in these examples may handle the first channel command word of a channel program and the DEB SIO may then be installed to handle all following channel command words. In still other implementations, the I/O handler 128 and the I/O manager 134 may simply utilize the Start IO to process all of the relevant channel command words.

During read operations, data of the dataset 120 may be read in parallel to the buffer 138, and then read serially from the buffer 138 by the application 116. In some implementations, the cloud memory manager 136 may read ahead to transfer blocks (or chunks of multiple blocks) from the simulated tape 118 together, e.g., during an open operation, in order to minimize latency experienced by the application 116 in reading the dataset 120 from the simulated tape 118.

Figure 2:
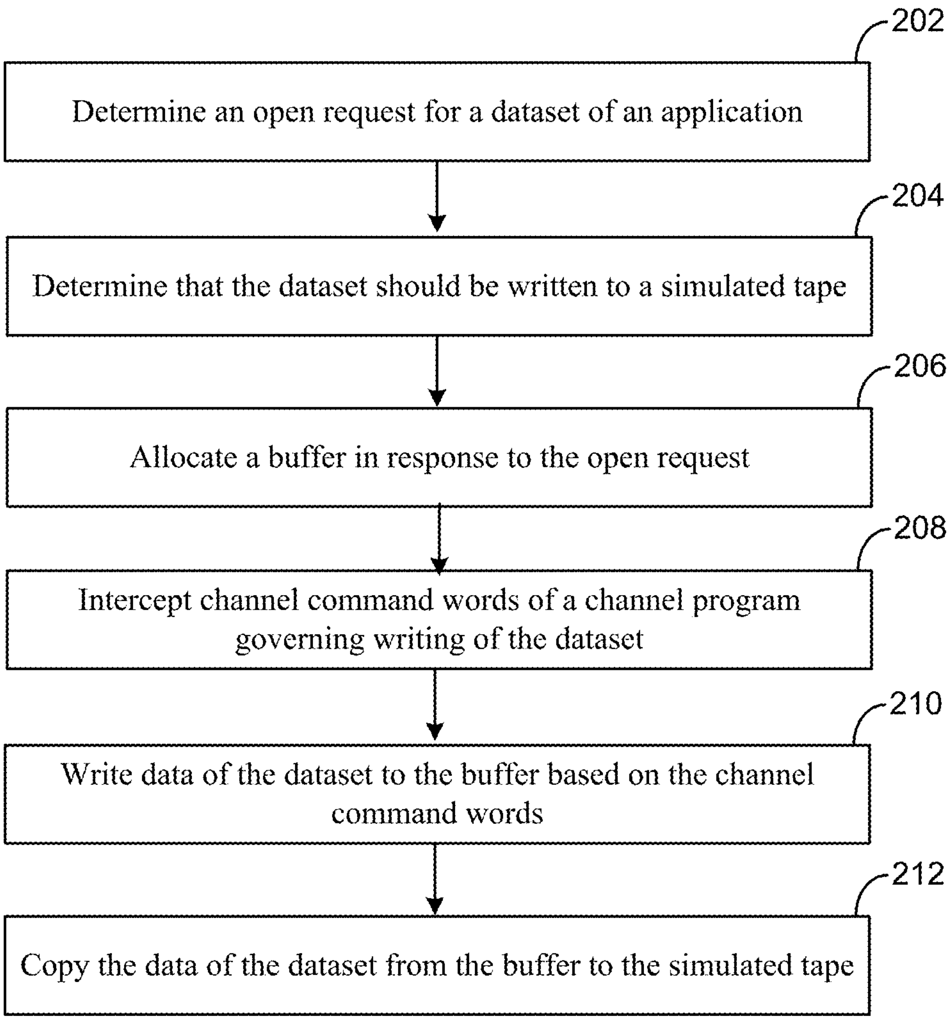
FIG. 2 is a flowchart illustrating example operations of the system of FIG. 1.

FIG. 2 is a flowchart illustrating example operations of the monitoring system of FIG. 1. In the example of FIG. 2, operations 202-208 are illustrated as separate, sequential operations. In various implementations, the operations 202-208 may include sub-operations, may be performed in a different order, may include alternative or additional operations, or may omit one or more operations. Further, in all such implementations, included operations may be performed in an iterative, looped, nested, or branched fashion.

In the example of FIG. 2, an open request for a dataset of an application may be determined (202). For example, following allocation of the simulated tape drive 115 for the application 116, including generation of a tape name and other tape parameters for the simulated tape 118 by the tape simulator 130, the OCE manager 132 may utilize the OCE handler 126 (e.g., OCE exit) to determine an open operation initiated by the application 116.

The dataset may be determined to be written to a simulated tape (204). For example, the tape simulator 130 may determine from the allocation manager 124 that all datasets of the application 116, or some subset of datasets defined by file name, file type, user name, or other parameter(s), designate that at least the dataset 120 should be written to the simulated tape 118.

A buffer may be allocated in response to the open request (206). For example, the OCE manager 132 may communicate with the cloud memory manager 136 to cause the cloud memory manager 136 to allocate the buffer 138.

Channel command words of a channel program governing writing of the dataset may be intercepted (208). For example, the I/O manager 134 may utilize or interface with the I/O handler to determine I/O events associated with channel command words of a channel program, such write commands of an Execute Channel Program (EXCP). As described, in some examples, during the open operation the OCE manager 132 may install a DEB SIO, which may be referred to as a DEB EXCP SIO when used with an EXCP, which may then operate as the I/O manager 134. In other examples, the open operation may be allowed to complete, and the I/O manager 134 may capture an initial system I/O, such as Start I/O, associated with an initial channel command word, and then install the DEB EXCP SIO to handle subsequent channel command words. In still other examples, the open operation may be allowed to complete, and the I/O manager 134 may capture all relevant channel command words using a system I/O, such as Start I/O.

Data of the dataset may be written to the buffer based on the channel command words (210). For example, the application 116 may use the channel command words, as determined by the I/O manager 134 (e.g., DEB EXCP SIO or associated DEB EXCP SIO intercept), to write serially to the division 140 of the buffer 138.

The data of the dataset may be copied from the buffer to the simulated tape (212). For example, the cloud memory manager 136 may copy data (e.g., blocks or chunks of blocks of data) from the division 140 in parallel to the simulated tape 118.

FIG. 3 is a more detailed flowchart illustrating example operations of the system of FIG. 1. FIG. 3 illustrates that an application 302 may open (304) a dataset using three difference access methods.

As shown, an interface 306 provides interactions between record level QSAM handling (308), block level BSAM handling (316), and/or an EXCP channel program (324). In QSAM handling, writing occurs using a PUT Record macro 310 that results in a call 312 to QSAM access method modules 314 to thereby perform write operations. Not shown in FIG. 3, a GET Record macro may be used with the QSAM access method modules 314 to read data of a dataset.

In BSAM handling, writing occurs using a WRITE Block macro 318 that results in a call 320 to BSAM access method modules 322 to thereby perform write operations. Not shown in FIG. 3, a READ Block macro may be used with the BSAM access method modules 322 to read data of a dataset.

In EXCP handling, a channel program may be executed (326) to execute a call 328 to EXCP access method modules 330 to thereby perform write or read operations. As described, channel command words of the EXCP may be used by the EXCP access method modules 330 to perform write or read operations.

FIG. 4 is a block diagram illustrating simplified example access methods that can be used with the examples of FIGS. 1-3. FIG. 4 illustrates the relationships between QSAM, BSAM, and EXCP access methods.

As shown, QSAM access method modules 402 collect individual records (404) until a block's worth of records is accumulated. A block is then written (406) using the BSAM access method modules 408.

At this point, a channel program is generated (410), e.g., an EXCP 412. EXCP access method modules 414 may then execute a StartIO 416 to execute a channel command word(s) of the EXCP, followed by using a start subchannel command 418 to interact with a physical device (e.g., the physical tape drive 112 of FIG. 1).

Thus, FIG. 4 illustrates that records-based QSAM access may rely on block-based BSAM access. QSAM access may also skip BSAM access. Eventually, however, either QSAM and/or BSAM leads to EXCP-based access. A given application may use any of the three access methodologies. In general, QSAM may be easier to work with for application developers and users, e.g., may be easier to predict access results and easier to avoid access errors, but may be less performant. Conversely, applications that directly use EXCP access methods and associated channel programs may be more performant, but may be more difficult to use and more prone to error. In any case, by interacting at the EXCP level, described techniques are capable of working with applications that use any of the three access methods, since all such applications eventually utilize EXCP-based access methods.

In particular, when writing to a physical tape drive, EXCP access method modules 414 may be used to implement a Start IO 416 that causes a write to the physical tape drive using Start Subchannel 418. When writing to a simulated tape drive, the Start IO 416 may be recognized at the first CCW as a trigger to install the DEB-EXCP_SIO, the Start Subchannel 418 may be skipped since no physical tape drive is used, and the first write operation to the buffer may be executed based on the Start IO (420). Then, on second and subsequent CCWs, the EXCP access method modules 414 may skip the Start IO 416 and instead use the installed DEB-EXCP-SIO to write to the buffer (422).

In other implementations, as referenced above, the DEB-EXCP-SIO may be omitted entirely. In these implementations, the Start IO may be used to perform all CCWs while skipping use of the Start Subchannel.

In other implementations, the DEB-EXCP-SIO may be installed during an open operation. In these implementations, the Start IO may be skipped for all CCWs occurring between open and close operations, including the first CCW, and the DEB-EXCP-SIO may be used from the first CCW.

Figure 5:
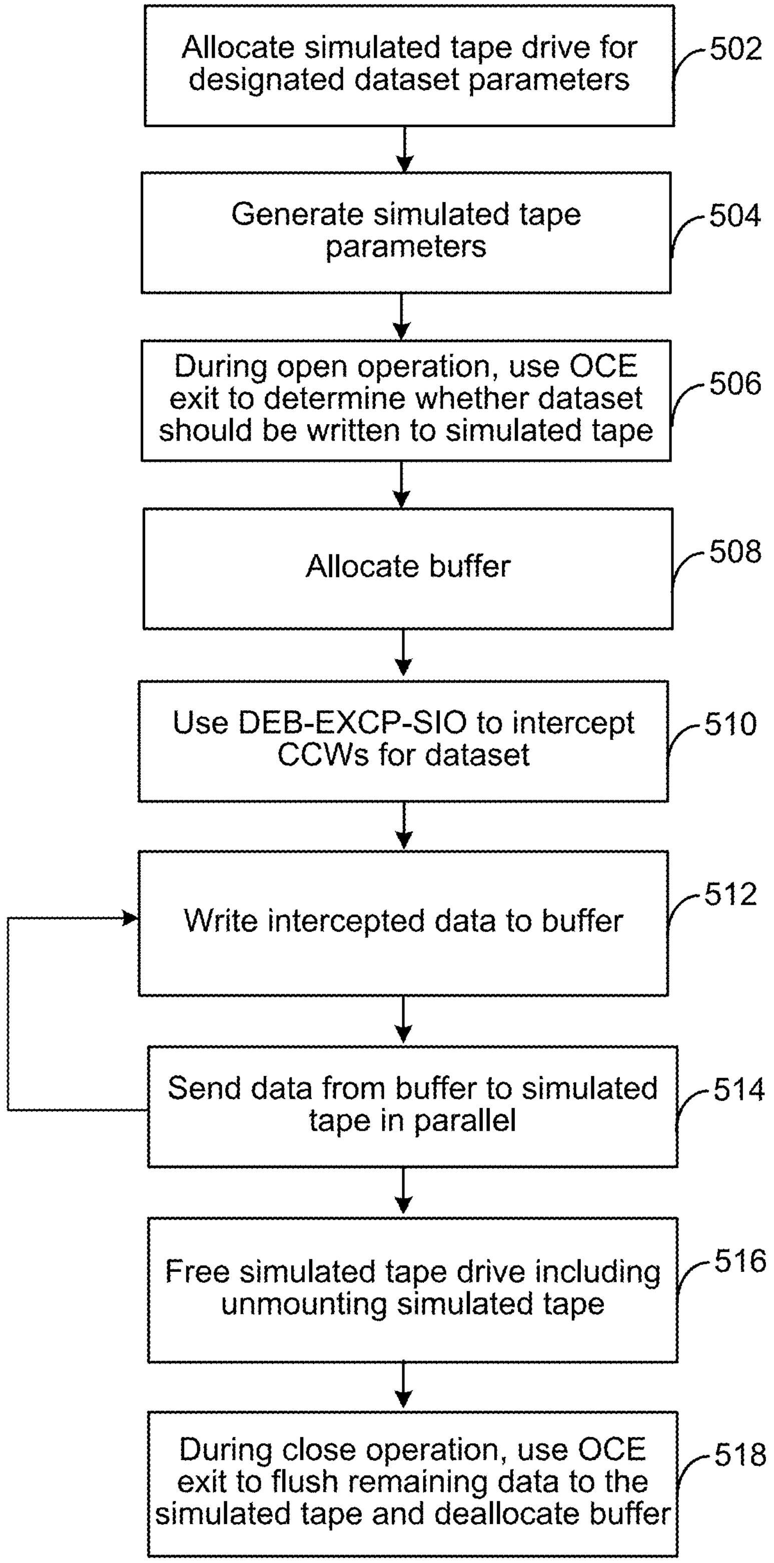
FIG. 5 is a flowchart illustrating an example implementation of the access methods of FIG. 4.

FIG. 5 is a flowchart illustrating an example implementation of the access methods of FIG. 4. In FIG. 5, a simulated tape drive is allocated based on designated dataset parameters (502). For example, a simulated tape drive may be allocated upon loading of an application, and/or in preparation for writing/reading a dataset(s) of an application. Dataset parameters triggering use of a simulated tape drive may include, e.g., file type, user ID, user role, application, or application type.

Simulated tape parameters may be generated (504). For example, simulated tape parameters may include a simulated tape name (e.g., volume name), header and trailer parameters, and volume size information (e.g., depending on a quantity of data to be stored using the simulated tape).

During an open operation for a relevant dataset, an OCE exit may be used to determine whether a relevant dataset should be written to a simulated tape (506). For example, one or more of the previously referenced dataset parameters may be used to determine whether the dataset should be written to the simulated tape.

Assuming the dataset should be written to the simulated tape, a buffer of suitable size is allocated (508). Resulting buffer parameters may include an overall size of the buffer. Other buffer parameters may include two or more divisions within the buffer. The size of the buffer, number of divisions, and sizes of divisions may all be determined based on, e.g., a size of the dataset and on an anticipated rate of data transfer between the buffer and the simulated tape.

A DEB-EXCP-SIO intercept may be used to intercept CCWs of a channel program used by the application for the dataset (510). As referenced above, the DEB-EXCP-SIO intercept may be installed to use an associated DEB to capture IO events prior to the IO events interacting with a physical device (e.g., will prevent the Start IO and start subchannel command). The DEB-EXCP-SIO may be installed during the open operation, or after completion of the open operation. In the latter case, the DEB-EXCP-SIO may be installed following an initial intercept of a Start IO command associated with a first CCW of the channel program. In other implementations, the DEB-EXCP-SIO may be omitted entirely from the process and the Start IO commands may be used to intercept the CCWs.

Intercepted data may then be written to the previously allocated buffer (512), based on the CCWs. The data may be written serially to the buffer, as output by the application in anticipation of writing to a physical tape.

The data may then be sent from the buffer to the simulated tape in parallel (514), e.g., in chunks of multiple blocks of data. For example, data from one division of the buffer may be sent while data is being written to another division of the buffer. In this way, the application may write synchronously to the buffer, without having to wait for space to be available, even if the buffer is a fraction of the size of the overall dataset. As described herein, if writing to the simulated tape is slowed, e.g., due to network conditions, then data may be queued separately, as referenced above and described in more detail, below, with respect to FIG. 6. The chunk size itself does not need to be the same size as, or dictated by a size of, the buffer divisions. For example, the chunk size may be configured to maximize throughput based on, e.g., a latency and/or performance capabilities of the cloud memory 114.

As referenced above, during allocation a tape is mounted to a tape drive, verified, and positioned to the beginning of the data, prior to commencement of open operations. Likewise, prior to a close operation, a FREE process may be performed that is the inverse of allocation. That is, during FREE, a tape is rewound and unmounted (516). In FIG. 5, the operating system sends these requests to the simulated tape drive, and these requests are intercepted/handled using the system Start IO.

Once all of the data of the dataset has been written to the buffer and the FREE operation has been performed, a subsequent close operation for the application may commence. During the close operation, the OCE exit may be used (518), e.g., to flush remaining data from the buffer to the simulated tape, and then to deallocate the buffer.

Figure 6:
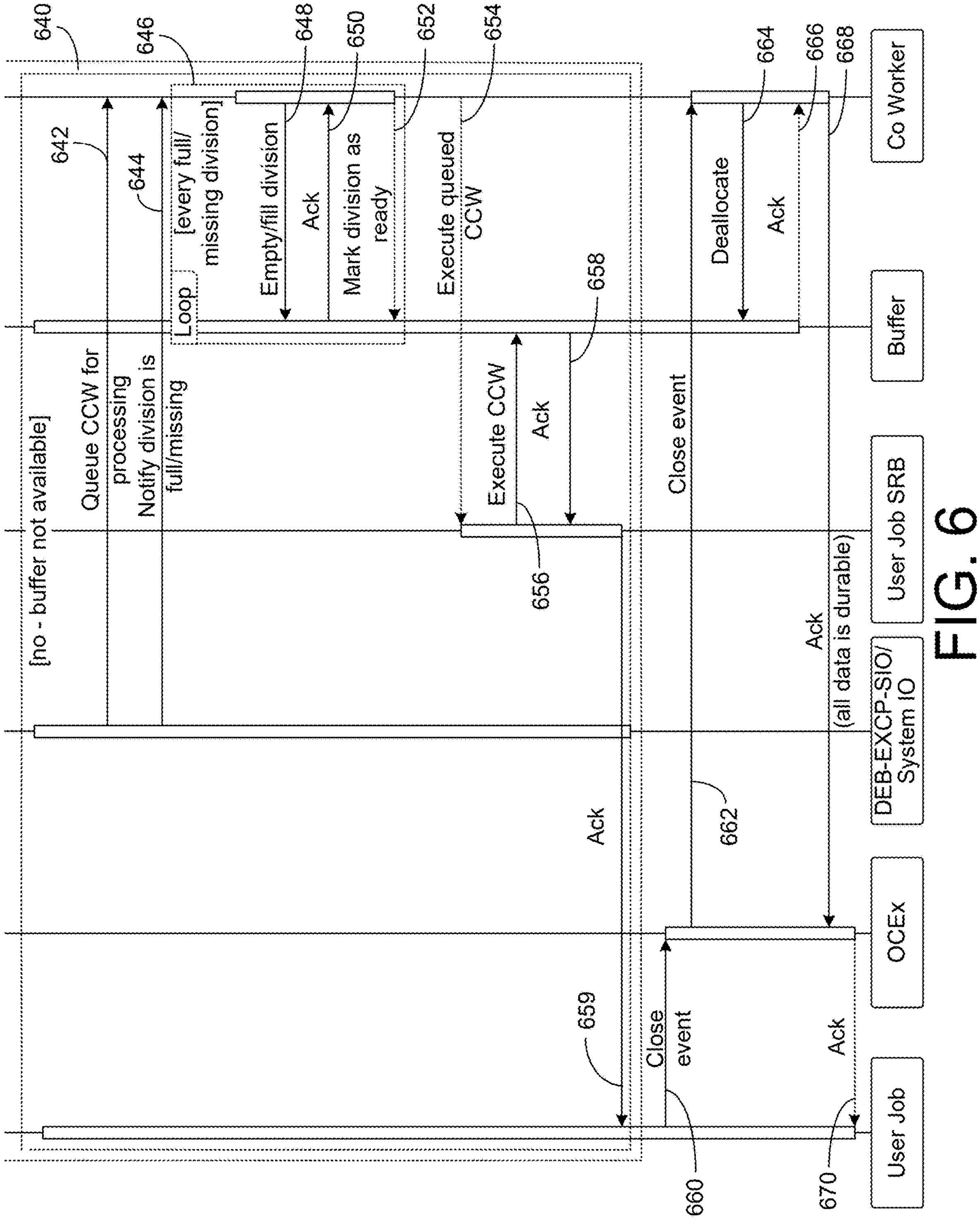
FIG. 6 is a timing diagram illustrating an example write process of the system of FIG. 1.

FIG. 6 is a timing diagram illustrating an example write process of the system of FIG. 1. FIG. 6 illustrates operations of a user job 602, an OCE exit (OCEx) 604, an SIO intercept 606 (either a DEB-EXCP-SIO and/or System IO), a user job service request block (SRB) 608, a buffer 610, and a cloud memory manager 612. FIG. 6 assumes that allocation of a simulated tape drive and related operations have already been performed.

Thus, in FIG. 6, an open event 614 occurs, to which the OCEx 604 provides access. The OCEx notifies (616) the cloud memory manager 612, which allocates (618) the buffer 610. Upon receipt of acknowledgment (620) from the buffer 610, the cloud memory manager 612 provides an acknowledgement (622) to the OCEx 604, which itself then provides an acknowledgement (624) to the user job 602.

At this point, an application loop 626 may commence for execution of the relevant channel program, including included CCWs. The DEB-EXCP-SIO intercept 606 may be installed prior to the loop 626 commencing, e.g., as part of the open event 614. Or, a first CCW of the loop may be captured by the system IO and the DEB-EXCP-SIO may be installed at that point, to be used in capturing subsequent CCWs.

Within the loop 626, then, a CCW is executed (628) and captured either by the SIO or the DEB-EXCP-SIO intercept. The buffer 610 may be determined to be available or not (630). For example, the buffer 610 may not be available if the network connection to the cloud memory and simulated tape is slow. The buffer 610 may thus reply yes/no to indicate its availability (632).

In an alternative loop 634, when the buffer 610 is available, then the CCW may be executed (636), e.g., by performing a write to the buffer 610, followed by an acknowledgement 638 from the buffer 610 (638), and then an acknowledgement 639 to the user job 602.

In an alternative loop 640, when the buffer 610 is not available, then the CCW may be queued for processing (642) by the cloud memory manager 612, and a notification may be provided (644) that the relevant buffer division is full or missing. Then, a loop 646 may be performed for every full/missing buffer division.

As shown, in the loop 646, the relevant division may be emptied to the cloud (648) and an acknowledgement may be sent (650) to the cloud memory manager 612, until the division may be marked as read (652) for processing queued CCWs. Then, a command to execute the queued CCW may be sent (654) to the SRB 608 used to store the queued CCWs. That is, the SRB 608 may be scheduled by the cloud memory manager 612 when needed, and may then execute the queued CCW (656) by writing to the buffer 610, which provides an acknowledgement (658) in reply. Although only the single queued CCW is shown explicitly in FIG. 6, an application loop may be provided to process multiple queued CCWs. Once all queued CCWs have been processed, the SRB 608 may send an acknowledgement (659) to the user job 602.

Put another way, queuing is performed for each channel program. For example, a given channel program comprising multiple CCWs may successfully complete writing of a first subset of CCWs (e.g., the first five CCWs) but may then require queuing of a remaining subset of CCWs. During dequeuing, then, all CCWs not previously processed are processed, and the relevant application job is notified that the channel program has completed. Similar comments would apply for each channel program if multiple channel programs are used.

During a subsequent close event 660, the OCEx 604 may send a notification (662) of the close event to the cloud memory manager 612. The cloud memory manager 612 may then deallocate (664) the buffer 610. Upon receipt of a corresponding acknowledgement (666) from the buffer, the cloud memory manager 612 may send an acknowledgement (668) to the OCEx 604, which may then send an acknowledgement (670) to the user job 602. As described above, deallocation of the buffer 610 may include flushing any remaining data to the cloud (e.g., simulated tape).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, a server, a mainframe computer, multiple computers, or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

intercept an open request for a dataset of an application;

determine, following the intercept and based on at least one parameter associated with the open request, that the dataset should be written to a simulated tape;

allocate a buffer during the open request;

intercept channel command words of a channel program governing writing of the dataset;

write data of the dataset to the buffer based on the channel command words; and copy the data of the dataset from the buffer to the simulated tape.

2. The computer program product of claim 1, wherein the instructions are further configured to cause the at least one computing device to:

allocate a simulated tape drive for the simulated tape.

3. The computer program product of claim 1, wherein the instructions are further configured to cause the at least one computing device to:

allocate the simulated tape including generating at least one tape parameter associated with the application; and write the data of the dataset from the buffer to the simulated tape, using the at least one tape parameter.

4. The computer program product of claim 3, wherein the at least one tape parameter includes a name of the simulated tape.

5. The computer program product of claim 1, wherein the instructions are further configured to cause the at least one computing device to:

gain control of the open request using an Open Close End of volume exit (OCEx) to initiate allocation of the buffer.

6. The computer program product of claim 1, wherein the instructions are further configured to cause the at least one computing device to:

determine that the dataset should be written to the simulated tape based on a dataset parameter of the dataset.

7. The computer program product of claim 1, wherein the instructions are further configured to cause the at least one computing device to:

allocate the buffer with at least a first division and a second division; and write second data of the dataset to the second division while the data is being copied to the simulated tape from the first division.

8. The computer program product of claim 1, wherein the channel program is used by an Execute Channel Program (EXCP) access method module.

9. The computer program product of claim 1, wherein the instructions are further configured to cause the at least one computing device to:

intercept the channel command words using a Data Extent Block System Input/Output (DEB SIO) intercept.

10. The computer program product of claim 1, wherein the instructions are further configured to cause the at least one computing device to:

determine a close event of the application for the dataset;

gain control of the close event using an Open Close End of volume exit (OCEx); and flush remaining data of the dataset from the buffer to the simulated tape.

11. A computer-implemented method, the method comprising:

intercepting an open request for a dataset of an application;

determining, following the intercept and based on at least one parameter associated with the open request, that the dataset should be written to a simulated tape;

allocating a buffer during the open request;

intercepting channel command words of a channel program governing writing of the dataset;

writing data of the dataset to the buffer based on the channel command words; and copying the data of the dataset from the buffer to the simulated tape.

12. The method of claim 11, further comprising:

allocating a simulated tape drive for the simulated tape.

13. The method of claim 11, further comprising:

allocating the simulated tape including generating at least one tape parameter associated with the application; and writing the data of the dataset from the buffer to the simulated tape, using the at least one tape parameter.

14. The method of claim 11, wherein the channel program is used by an Execute Channel Program (EXCP) access method module.

15. The method of claim 11, further comprising:

intercepting the channel command words using a Data Extent Block System Input/Output (DEB SIO) intercept.

16. The method of claim 11, further comprising:

determining a close event of the application for the dataset;

gaining control of the close event using an Open Close End of volume exit (OCEx); and flushing remaining data of the dataset from the buffer to the simulated tape.

17. A mainframe system comprising:

at least one memory including instructions; and at least one processor that is operably coupled to the at least one memory and that is arranged and configured to execute instructions that, when executed, cause the at least one processor to intercept an open request for a dataset of an application;

determine, following the intercept and based on at least one parameter associated with the open request, that the dataset should be written to a simulated tape;

allocate a buffer during the open request;

intercept channel command words of a channel program governing writing of the dataset;

write data of the dataset to the buffer based on the channel command words; and copy the data of the dataset from the buffer to the simulated tape.

18. The system of claim 17, wherein the instructions are further configured to cause the at least one processor to:

allocate a simulated tape drive for the simulated tape.

19. The system of claim 17, wherein the instructions are further configured to cause the at least one processor to:

allocate the simulated tape including generating at least one tape parameter associated with the application; and write the data of the dataset from the buffer to the simulated tape, using the at least one tape parameter.

20. The system of claim 17, wherein the instructions are further configured to cause the at least one processor to:

determine a close event of the application for the dataset;

gain control of the close event using an Open Close End of volume exit (OCEx); and flush remaining data of the dataset from the buffer to the simulated tape.

* * * * *